(12) United States Patent
Walker et al.

(10) Patent No.: US 8,493,834 B2
(45) Date of Patent: Jul. 23, 2013

(54) CONTENT-ADAPTIVE MULTIMEDIA CODING AND PHYSICAL LAYER MODULATION

(75) Inventors: Gordon Kent Walker, Poway, CA (US);
Fuyun Ling, San Diego, CA (US);
Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 11/622,912

(22) Filed: Jan. 12, 2007

(65) Prior Publication Data

US 2008/0049597 A1 Feb. 28, 2008

Related U.S. Application Data

(60) Provisional application No. 60/840,837, filed on Aug. 28, 2006.

(51) Int. Cl.
*H04J 9/00* (2006.01)

(52) U.S. Cl.
USPC .......................................... 370/204

(58) Field of Classification Search
USPC ................... 370/465, 466, 204; 375/136, 147
See application file for complete search history.

(56) References Cited

U.S. PATENT DOCUMENTS

| | | | | |
|---|---|---|---|---|
| 5,671,319 A | * | 9/1997 | Ueda | 386/96 |
| 6,947,490 B1 | * | 9/2005 | Edwards et al. | 375/261 |
| 6,968,005 B2 | * | 11/2005 | Hannuksela | 375/240.01 |
| 2003/0081580 A1 | * | 5/2003 | Vaidyanathan et al. | 370/338 |
| 2003/0103571 A1 | | 6/2003 | Meehan et al. | |
| 2003/0152062 A1 | * | 8/2003 | Terry et al. | 370/349 |
| 2004/0081075 A1 | * | 4/2004 | Tsukakoshi | 370/206 |
| 2005/0200757 A1 | * | 9/2005 | Pica et al. | 348/390.1 |
| 2007/0030917 A1 | * | 2/2007 | Farag | 375/265 |
| 2007/0133449 A1 | * | 6/2007 | Schacht et al. | 370/312 |
| 2009/0161641 A1 | * | 6/2009 | Kim | 370/338 |
| 2010/0041351 A1 | * | 2/2010 | Himayat et al. | 455/101 |
| 2011/0190018 A1 | * | 8/2011 | Love et al. | 455/509 |

FOREIGN PATENT DOCUMENTS

| | | |
|---|---|---|
| CN | 1593050 A | 3/2005 |
| JP | 9321813 A | 12/1997 |
| JP | 2005505163 | 2/2005 |
| KR | 200624417 | 3/2006 |
| WO | WO03028228 | 4/2003 |

OTHER PUBLICATIONS

International Search Report and Written Opinion—PCT/US2007/076845, International Search Authority—European Patent Office—Mar. 6, 2008.

(Continued)

*Primary Examiner* — Mark Rinehart
*Assistant Examiner* — Peter Cheng
(74) *Attorney, Agent, or Firm* — Fulbright & Jaworski LLP

(57) ABSTRACT

This disclosure describes content-adaptive coding and modulation techniques. In particular, this disclosure describes techniques in which both a multimedia coding mode and a physical layer modulation scheme are adaptively selected based on content of a multimedia sequence. When the content changes such that either the coding or the modulation scheme can be improved, the coding and/or modulation may be changed to better optimize to the changed content. In one aspect, this disclosure provides a method of processing multimedia data, the method comprising selecting a multimedia coding mode for an encoder to encode the multimedia data and a physical layer modulation scheme for transmission of the multimedia data based on content of the multimedia data.

68 Claims, 6 Drawing Sheets

OTHER PUBLICATIONS

Keansub Lee et al: "Perception-based image transcoding for universal multimedia access" Proceedings 2001 International Conference on Image Processing. ICIP 2001. Thessaloniki, Greece, Oct. 7-10, 2001, International Conference on Image Processing, New York, NY : IEEE, US, vol. vol. 1 of 3. Conf. 8, Oct. 7, 2001, pp. 475-478, XP010563801 ISBN: 0-7803-6725-1.

Lei Z et al: "Adaptive video transcoding and streaming over wireless channels" Journal of Systems & Software, Elsevier North Holland, New York, NY, US, yol. 75, No. 3, Mar. 2005, pp. 253-270, XP004656968 ISSN: 0164-1212.

* cited by examiner

CONTENT-ADAPTIVE MULTIMEDIA CODING AND PHYSICAL LAYER MODULATION

This application claims the benefit of U.S. Provisional Application No. 60/840,837, filed Aug. 28, 2006, the entire content of which is incorporated herein by reference.

TECHNICAL FIELD

This disclosure relates to multimedia coding for coding multimedia data and physical layer modulation schemes for transmitting multimedia data.

BACKGROUND

Multimedia capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital multimedia coding can provide significant improvements over conventional analog systems in creating, modifying, transmitting, storing, recording and playing full motion multimedia sequences. Broadcast networks, for example, may use multimedia coding to facilitate the broadcast of one or more channels of multimedia sequences to wireless subscriber devices. Broadcasting techniques used in such broadcast networks include those referred to as Forward Link Only (FLO), Digital Multimedia Broadcasting (DMB), and Digital Video Broadcasting—Handheld (DVB-H).

Digital multimedia broadcasting typically relies on one or more digital multimedia encoding standards. A number of different multimedia coding standards have been established for coding digital multimedia sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU H.264 standard and a number of proprietary standards. The ITU H.264 standard is also set forth in MPEG-4 Part 10, entitled "Advanced Audio Coding."

A variety of other coding techniques have also been developed. For example, interpolation techniques (sometimes referred to as Frame Rate Up-Conversion (FRUC) techniques) have been developed to interpolate additional frames between transmitted multimedia frames in order to increase the effective frame rate of a multimedia sequence on the decoder side. Also, scalable coding approaches have been developed in which multimedia frames are transmitted as a base layer and one or more enhancement layers. Scalable coding can be used to provide signal-to-noise ratio (SNR) scalability, temporal scalability, and/or spatial scalability in multimedia compression applications. The base layer carries a minimum amount of data necessary for multimedia decoding, and provides a base level of quality. The enhancement layer carries additional data that enhances the quality of the decoded multimedia sequence, but may have a higher packet error rate than the base layer and/or require a higher signal-to-noise ratio (SNR) to achieve the same packet error rate. These techniques, including interpolation techniques and/or scalable video coding techniques, may be used with or without compliance with the coding standards listed above.

SUMMARY

This disclosure describes content-adaptive coding and modulation techniques. In particular, this disclosure describes techniques in which both a multimedia coding mode and a physical layer modulation scheme are adaptively selected based on content of a multimedia sequence. When the content changes such that either the coding or the modulation scheme can be improved, the coding and/or modulation may be changed to improve coding and transmission of the changed content. The coding and/or modulation changes may be useful when high motion content changes to low motion, such as when a commercial break interrupts a sporting event during a televised broadcast. The described techniques may be particularly useful in a multicast broadcasting system for wireless devices, although the techniques may find application in other multimedia coding contexts in which coded video information is transmitted between two or more devices.

In one aspect, this disclosure provides a method of processing multimedia data. The method comprises selecting a multimedia coding mode from a plurality of potential multimedia coding modes for an encoder to encode the multimedia data based on content of the multimedia data, selecting a physical layer modulation scheme from a plurality of potential physical layer modulation schemes for transmission of the multimedia data based on content of the multimedia data, encoding the multimedia data according to the selected multimedia coding mode, and transmitting the encoded multimedia data according to the selected physical layer modulation scheme.

In another aspect, this disclosure provides a method of processing multimedia data, the method comprising receiving first multimedia data associated with a multimedia sequence, receiving first information identifying a first selected multimedia coding mode and a first selected physical layer modulation scheme used by an encoding device for the first multimedia data, demodulating and decoding the first multimedia data based on the selected physical layer modulation scheme and the selected multimedia coding mode, receiving second multimedia data associated with the multimedia sequence, receiving second information identifying a second selected multimedia coding mode and a second selected physical layer modulation scheme used by an encoding device for the second multimedia data, and demodulating and decoding the second multimedia data based on the second selected physical layer modulation scheme and the second selected multimedia coding mode.

In another aspect, this disclosure provides an apparatus that processes multimedia data, the apparatus comprising a controller that selects a multimedia coding mode from a plurality of multimedia coding modes and a physical layer modulation scheme from a plurality of physical layer modulation schemes for the multimedia data based on content of the multimedia data, an encoder that applies the selected multimedia coding mode to code the multimedia data, and a transmitting module that applies the selected physical layer modulation scheme to modulate the coded multimedia data for transmission over a wireless channel.

In another aspect, this disclosure provides an apparatus that processes multimedia data, the apparatus comprising a receiving module that receives first multimedia data associated with a multimedia sequence and receives first information identifying a first selected multimedia coding mode and a first selected physical layer modulation scheme used by an encoding device for the first multimedia data, a demodulator that demodulates the first multimedia data based on the selected physical layer modulation scheme, and a decoder that decodes the first multimedia data based on the selected multimedia coding mode, wherein the receiving module receives second multimedia data associated with the multimedia sequence and receives second information identifying a second selected multimedia coding mode and a second selected physical layer modulation scheme used by an encoding device for the second multimedia data, the demodulator demodulates the second multimedia data based on the second selected physical layer modulation scheme, and the decoder decodes the second multimedia data based on the second selected multimedia coding mode.

In another aspect, this disclosure provides an apparatus that processes multimedia data, the apparatus comprising means for selecting a multimedia coding mode from a plurality of potential multimedia coding modes and a physical layer modulation scheme from a plurality of potential physical layer modulation scheme for the multimedia data based on content of the multimedia data, means for coding the multimedia data based on the selected multimedia coding mode, and means for transmitting the coded multimedia data according to the selected physical layer modulation scheme.

In another aspect, this disclosure provides an apparatus that processes multimedia data, the apparatus comprising means for receiving first multimedia data associated with a multimedia sequence, means for receiving first information identifying a first selected multimedia coding mode and a first selected physical layer modulation scheme used by an encoding device for the first multimedia data, means for demodulating the first multimedia data based on the selected physical layer modulation scheme, means for decoding the first multimedia data based on the selected multimedia coding mode, means for receiving second multimedia data associated with the multimedia sequence, means for receiving second information identifying a second selected multimedia coding mode and a second selected physical layer modulation scheme used by an encoding device for the second multimedia data, means for demodulating the second multimedia data based on the second selected physical layer modulation scheme, and means for decoding the second multimedia data based on the second selected multimedia coding mode.

In another aspect, this disclosure provides a processor that processes multimedia data, the processor being configured to select a multimedia coding mode from a plurality of potential multimedia coding modes for an encoder to encode the multimedia data based on content of the multimedia data, select a physical layer modulation scheme from a plurality of potential physical layer modulation schemes for transmission of the multimedia data based on content of the multimedia data, encode the multimedia data according to the selected multimedia coding mode, and forward the encoded multimedia data to a transmitting module for transmission according to the selected physical layer modulation scheme.

In another aspect, this disclosure provides a processor that processes multimedia data, the processor being configured to receive first multimedia data associated with a multimedia sequence, receive first information identifying a first selected multimedia coding mode and a first selected physical layer modulation scheme used by an encoding device for the first multimedia data, demodulate and decode the first multimedia data based on the selected physical layer modulation scheme and the selected multimedia coding mode, receive second multimedia data associated with the multimedia sequence, receive second information identifying a second selected multimedia coding mode and a second selected physical layer modulation scheme used by an encoding device for the second multimedia data, and demodulate and decode the second multimedia data based on the second selected physical layer modulation scheme and the second selected multimedia coding mode.

The techniques described in this disclosure may be implemented in hardware, software, firmware, or any combination thereof. If implemented in software, the software may be executed in a computer. The software may be initially stored as instructions, program code, or the like. Accordingly, the disclosure also contemplates a computer program product for processing multimedia data comprising a computer-readable medium, wherein the computer-readable medium comprises instructions for causing a computer to execute techniques and functions according to this disclosure. Alternatively, if implemented in hardware, such hardware implementations may be digital, analog or both. Aspects of this disclosure may be embodied in the computer-readable medium or a computer program product that comprises the computer-readable medium. The computer program product may include packaging materials.

Thus, in another aspect, this disclosure provides a computer program product comprising a computer readable medium comprising instructions that upon execution cause a computer to select a multimedia coding mode from a plurality of potential multimedia coding modes for an encoder to encode the multimedia data based on content of the multimedia data, select a physical layer modulation scheme from a plurality of potential physical layer modulation schemes for transmission of the multimedia data based on content of the multimedia data, encode the multimedia data according to the selected multimedia coding mode, and transmit the encoded multimedia data according to the selected physical layer modulation scheme.

Also, in another aspect, this disclosure provides a computer program product comprising a computer readable medium comprising instructions that upon execution cause a computer to receive first multimedia data associated with a multimedia sequence, receive first information identifying a first selected multimedia coding mode and a first selected physical layer modulation scheme used by an encoding device for the first multimedia data, demodulate and decode the first multimedia data based on the selected physical layer modulation scheme and the selected multimedia coding mode, receive second multimedia data associated with the multimedia sequence, receive second information identifying a second selected multimedia coding mode and a second selected physical layer modulation scheme used by an encoding device for the second multimedia data, and demodulate and decode the second multimedia data based on the second selected physical layer modulation scheme and the second selected multimedia coding mode.

Additional details of various examples are set forth in the accompanying drawings and the description below. Other features, objects, advantages and examples will become apparent from the description and drawings, and from the claims.

DETAILED DESCRIPTION

Figure 1:
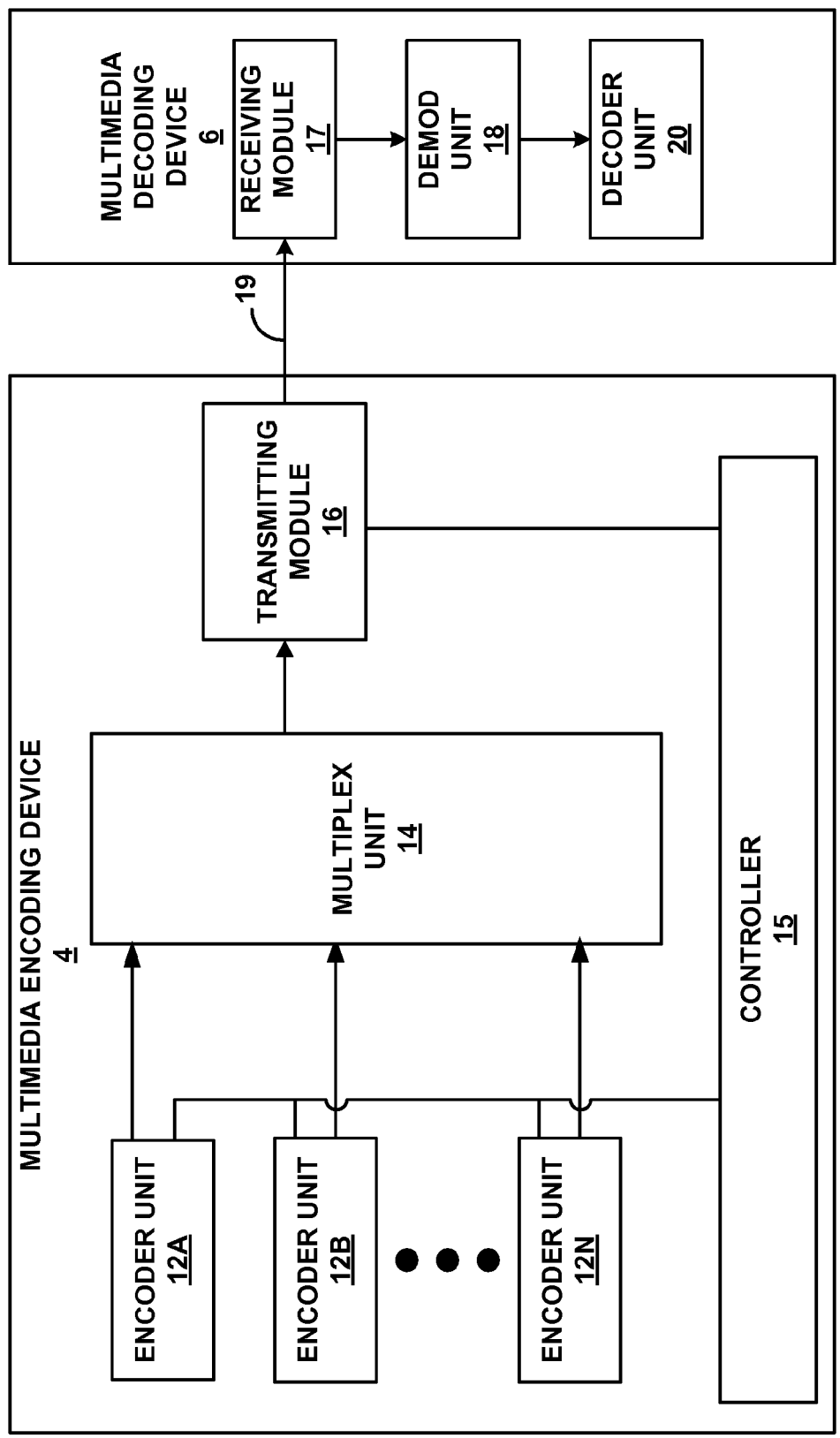
FIG. 1 is a block diagram illustrating an exemplary multicast broadcasting system according to this disclosure.

Various aspects of the disclosure are described below. It should be apparent that the teachings herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of a broadcast system that conveys multiple channels of multimedia data. One skilled in the art should appreciate that similar techniques could apply to systems that transmit a single channel of data or systems that transmit data in a non-broadcast manner.

This disclosure describes content-adaptive multimedia coding and modulation techniques. In particular, this disclosure describes techniques in which both a multimedia coding mode and a physical layer modulation scheme are adaptively selected based on content of a multimedia sequence being coded. As the content is encoded, the encoding device selects not only a multimedia coding mode, but also a modulation scheme used in the transmission of the data. The coding mode can be selected from a plurality of potential coding modes, and the modulation scheme can be selected from a plurality of potential modulation schemes. The most desirable multimedia coding mode and modulation scheme may both be affected by the content being coded.

Some broadcasting techniques, such as that referred to as Forward Link Only (FLO) allow for a modulation scheme to be selected for each channel of a multicast. The FLO technique is described, for example, in the Forward Link Only (FLO) Air Interface Specification, "Forward Link Only Air Interface Specification for Terrestrial Mobile Multimedia Multicast," to be published as Technical Standard TIA-1099 (the "FLO Specification"). The techniques of this disclosure may be applicable to such FLO techniques, or possibly other techniques, such as Digital Multimedia Broadcasting (DMB), and Digital Video Broadcasting—Handheld (DVB-H).

The multimedia coding mode may be selected between a first multimedia coding mode that relies on frame interpolation at a decoder (such as frame rate up-conversion) and a second multimedia coding mode that does not rely on frame interpolation. As another example, the multimedia coding mode may be selected between a first multimedia coding mode that uses scalable coding and a second multimedia coding mode that does not use scalable coding. In yet another example, the multimedia coding mode may be selected to define a frame rate among two or more potential frame rates. In this way, the multimedia coding mode is made to be a variable that can be selected to possibly improve the coding of a multimedia sequence.

For the modulation, as an example, a first physical layer modulation scheme may use quadrature phase shift keying (QPSK) and a second physical layer modulation scheme may use quadrature amplitude modulation (QAM). Many other types of modulation schemes or multimedia coding modes could also be used, according to this disclosure, as long as both the modulation scheme and the multimedia coding mode is allowed to adaptively change based on content. The change in modulation scheme may change the constellation, the error correction codes, or both. In any case, according to this disclosure, at least two variables (multimedia coding mode and physical layer modulation scheme) are content-adaptive to help ensure that an efficient overall method of information transfer is employed.

One particular case of different modulation schemes may comprise a first scheme that uses layered modulation where both layers use QPSK mapping, and second scheme is a "16 QAM" scheme. By properly choosing coding rates, it is possible, in this case to match the required signal-to-noise ratio (SNR) for the base layer of the QPSK mapping scheme to that for the QAM modulation scheme. In such a way, an error rate for these two schemes can be very similar while providing different spectral efficiency, which can be desirable.

The multimedia content associated with a multimedia sequence may change on a frame-by-frame basis, or even possibly on a slice-by-slice basis, where one frame is divided into several slices. Furthermore, for broadcast systems that transmit a multicast of channels to subscriber devices, the different channels of the multicast have different content. Accordingly, in some cases, this disclosure contemplates adaptive multimedia coding modes and adaptive modulation schemes that may change on a frame-by-frame basis with respect to each of many channels of a multicast. For other cases, such as for multimedia coding modes that use different frame rates, the multimedia coding modes may change with respect to sets of frames coded at a given frame rate. In these or other cases, the selection of a different multimedia coding mode and a different physical layer modulation scheme may occur periodically, e.g., at intervals of time.

One or more receiving devices receive the multicast and receive information identifying the multimedia coding mode and modulation schemes for the different channels. When a receiving device tunes to a particular channel, it uses the information identifying the multimedia coding mode and modulation scheme to select the appropriate decoding and demodulation techniques needed to retrieve the coded and modulated multimedia sequence.

FIG. 1 is a block diagram illustrating an exemplary multicast broadcasting system 2 according to this disclosure. System 2 is merely exemplary, as the techniques of this disclosure could be implemented in any setting where bandwidth is limited or where it is desirable to collectively improve upon coding and modulation. In system 2, a multimedia coding device 4 delivers content as a series of channels to many devices. For purposes of illustration, however, a single multimedia decoding device 6 is illustrated in FIG. 1. In most cases, several similar devices (like device 6) would receive the same broadcasts from device 4, but could individually tune to different channels. System 2 allows multimedia content delivery to device 6 in a manner that provides a user experience similar to that of a conventional television.

Multimedia coding device 4 may form part of a broadcast network component used to broadcast one or more channels of video to wireless subscriber devices. Multimedia coding device 4 is one example of a multicast device capable of broadcasting a multicast. Many other types of coding device, however, could also benefit from the teaching of this disclosure.

By way of example, multimedia decoding device 6, which receives the multicast, may be implemented as part of a digital television, a wireless communication device, a portable digital assistant (PDA), a laptop computer or desktop computer, a digital music and video device, such as those sold under the trademark "iPod," or a radiotelephone such as cellular, satellite or terrestrial-based radiotelephone. In most of the following examples, the decoding device is assumed to be a wireless radiotelephone, although this disclosure is not limited in this respect.

Multimedia coding device 4 and multimedia decoding device 6 may be implemented as one or more processors, digital signal processors, application specific integrated circuits (ASICs), field programmable gate arrays (FPGAs), discrete logic, software, hardware, firmware, or any combinations thereof. The illustrated components of device 4 and device 6 may be included in one or more encoder or decoders, either of which may be integrated as part of an encoder/decoder (CODEC). Other components (not illustrated) may also be included. In some cases, the transmitting module 16 of device 4 may be formed on a different component or chip than the other components of device 4, and similarly, receiving module 17 and demodulator unit 18 of device 6 may be formed on a different component or chip than the other components of device 6.

As noted, multimedia coding device 4 may form part of a broadcast network component used to broadcast one or more channels of video data. Examples of such components include wireless base stations or any infrastructure node used to broadcast the encoded multimedia data. As shown in FIG. 1, multimedia coding device 4 includes a plurality of encoder units 12A-12N (collectively "encoder units 12"). Each of these encoder units 12 may comprise a separate set of encoders or sets of encoding processes that may be called by one common encoder. Encoder units 12 may comply with the ITU H.264 standard, although this disclosure is not limited in this respect. Each of encoder units 12 encodes multimedia content for a different channel. The different channels may comprise different program content, such as news broadcasts, sporting events, television programs, movies, or the like. Moreover, different channels may present similar content in different views, such as the same sporting event from different camera angles. As described herein, each of encoder units 12 is content-adaptive, meaning that changes in the multimedia content may change the respective coding processes used by different ones of encoder units 12.

Controller 15 of device 6 may comprise the unit or process that selects the coding processes and modulation schemes used. In particular, for each channel, controller may select a multimedia coding mode for a respective encoder unit to encode the multimedia data, and may also select a physical layer modulation scheme for transmission of the multimedia data based on content of the multimedia data. When the content changes for a channel, controller 15 may select a different multimedia coding mode and a different physical layer modulation scheme in response to such content changes of the multimedia data. In this way, controller 15 selects both the multimedia coding mode that the physical layer modulation scheme for each respective channel in a way that can help collectively improve these factors for given content.

In some cases, the multimedia coding mode selection (based on content) may itself also affect the modulation scheme selection (also based on content). In this way, in some cases, the multimedia coding mode selection and modulation scheme selection can be viewed as interrelated decisions made by controller 15. In some cases, controller 15 selects the best multimedia coding mode for a given content and then selects the best modulation scheme for that selected multimedia coding mode and that given content. In some cases controller 15 selects the multimedia coding mode and the modulation scheme substantially simultaneously.

The selection of the modulation scheme may be based on capacity that can be supported by device 4. In this case, capacity refers to the percentage of RF energy that is available to the physical layer in relation to signal traffic. The selection of the modulation schemes for different channels may allow device 4 to maximize the number of services (audio and video) that can be delivered at a target quality level. In order to ensure that coverage is maintained in a coverage area, it may be desirable to select the different modes having similar SNR requirements while keeping a desirable error rate. For example, in FLO, the base layer of layered modulation Mode 7 requires an SNR similar to mode 2, i.e., a mode referred to as "16 QAM rate ⅓," in order to attain a similar packet error rate.

Once the content has been encoded, multiplex unit 14 combines the content into a multicast. This multicast typically includes multiple channels of data. If needed, multiplex unit 14 may communicate with encoder units 12 to adjust encoding rates applied by different ones of encoder units 12, e.g., to meet bandwidth requirements of communication channel 19. This, in turn, could cause another adjustment of the multimedia coding mode or modulation scheme.

Once multiplex unit 14 combines the content into a multicast, the data can be forwarded to transmitting module 16. Transmitting module 16 then modulates and transmits the multicast based on the selected modulation schemes for the different channels. In particular, in accordance with this disclosure, the physical layer modulation scheme used by for the different channels of the multicast is defined by the content of such channels, as determined during the encoding processes. Controller 15 provides the modulation selections to transmitting module 16 for the different channels. Transmitting module 16 then modulates the different channels according to the physical layer modulation selections for each of the channels, which were made based on content of the respective channels. Following modulation of the different channels, transmitting module 16 transmits the multicast over communication channel 19. In one example, units 12, 14 and 15 may be implemented as a processor that forwards the multicast of multimedia sequences to transmitting module 16 for transmission.

The transmitted multicast includes the encoded multimedia content of many different channels, which are each defined by a selected multimedia coding mode and selected modulation scheme. The multicast may be simultaneously delivered to many decoding devices, which may tune to a particular channel. Again, for purposes of illustration, FIG. 1 shows a single multimedia decoding device 6. In practice, however, many similar multimedia decoding devices (like device 6) may receive the same multicast from multimedia coding device 4.

For each channel of encoded multimedia data, in addition to the encoded multimedia data, multimedia coding device 4 also transmits information indicating the multimedia coding mode and physical layer modulation scheme used to code and modulate the respective multimedia data. This allows multimedia decoding device 6 to properly select the appropriate multimedia decoding mode and demodulation scheme. Since the multimedia coding mode and modulation scheme are both dynamic, information needs to be conveyed to device 6 to identify when any changes in the multimedia coding mode or modulation scheme occur.

Again, the multimedia coding mode for each channel may be selected for each of encoder units 12 between a first multimedia coding mode that relies on frame interpolation by a decoder (such as frame rate up-conversion) and a second multimedia coding mode that does not rely on frame interpolation. As another example, the multimedia coding mode may be selected for each of encoder units 12 between a first multimedia coding mode that implements scalable coding and a second multimedia coding mode that does not implement scalable coding. In this case, the scalable coding may provide signal-to-noise scalability, temporal scalability, spatial scalability or any combination of these or other types of scalability.

In yet another example, the multimedia coding mode may be selected for each of encoder units 12 to define a frame rate among two or more possible frame rates. Various combinations of these examples might also be implemented. Other factors that can distinguish multimedia coding modes include frame type cadence or the use or non-use of adaptive structures. Wavelet-based coding is also a possible option that might be used in a multimedia coding mode rather than block-based coding. In any case, the multimedia coding mode can be made to be a variable that can be selected to improve the coding of a multimedia sequence. Controller 15 makes these multimedia coding mode selections, as well as modulation scheme selections based on content.

For the modulation applied by transmitting module 16 for each respective channel, controller 15 may select between a first physical layer modulation scheme that implements quadrature phase shift keying (QPSK) and a second physical layer modulation scheme that implements quadrature amplitude modulation (QAM). As another example, the physical layer modulation scheme may either be a first physical layer modulation scheme or a second physical layer modulation scheme, wherein the first physical layer modulation scheme codes more bits per second than the second physical layer modulation scheme. As another example, the physical layer modulation scheme may either comprise a first physical layer modulation scheme that implements code division multiple access (CDMA) or a second physical layer modulation scheme that implements orthogonal frequency orthogonal frequency division multiplexing (OFDM). Various combinations of these or other modulation schemes may also be defined.

Moreover, many other types of modulation schemes or multimedia coding modes could also be used, according to this disclosure, as long as both the modulation scheme and the multimedia coding mode are allowed to adaptively change based on content. Thus, according to this disclosure, at least two variables (multimedia coding mode and physical layer modulation scheme) are content-adaptive to help ensure that an efficient overall method of information transfer is employed. Information for each channel identifying the multimedia coding mode and modulation scheme used is transferred to multimedia decoding device 6 as part of the multicast. This information identifying the multimedia coding mode and modulation scheme used may be delivered in each respective channel, e.g., as a header file to the multimedia frames, an overhead information service (OIS), or possibly in a dedicated media logical channel (MLC) designed to convey such information.

When the content changes in any given channel, the physical layer modulation scheme and/or multimedia coding mode for that channel may likewise change. As changes in the modulation scheme and/or multimedia coding mode occur, information of such changes may be conveyed as part of the multicast. In this manner, the adaptive multimedia coding mode and modulation scheme is always conveyed to the decoding devices, such as device 6. Since the multimedia coding mode itself can affect the decision of which modulation scheme to employ, these decisions may be interrelated. Still, the selections may be made at similar times, e.g., substantially simultaneously, although the techniques are not necessarily limited in this respect.

Communication channel 19 is typically a wireless channel, but is not limited by any particular wireless communication technique. By way of example, the multicast data may be communicated over channel 19 via code division multiple access (CDMA) techniques, frequency division multiple access (FDMA) techniques, time division multiple access (TDMA) techniques, orthogonal frequency division multiplexing (OFDM), other techniques, or various combinations of such techniques. For broadcast, many other techniques, such as amplitude modulation (AM), frequency modulation (FM), combinations of the techniques listed herein, or other types of modulation or coding, could also be used. The modulation scheme is selected based on content, and may change as the content changes.

Receiving module 17 of multimedia decoding device 6 receives the multicast over wireless channel 19. Demodulation unit 18 may then tune to a particular channel of interest, e.g., in response to a user selection, and may demodulate the content of that channel. The demodulation scheme to be used to demodulate the content of that channel may be conveyed as part of the multicast, e.g., as data in that respective channel or as information in a dedicated MLC designed to convey the modulation scheme and multimedia coding modes used for the different channels of the multicast.

Multimedia decoding device 6 may need to receive and decode the code rate and modulation mode information before it can correctly demodulate the data channel. Thus, such information may need to be sent and decoded prior to sending the data channel. If the multimedia coding mode and modulation scheme information is sent over the same data channel, it may be desirable to send such information in earlier packets of the data channel, e.g., before the data packets, whenever a new multimedia coding mode and/or modulation scheme is used.

Decoder unit 20 can decode the content of the channel that is demodulated by demodulator unit 18. The multimedia decoding mode that is to be used to decode the content of that channel, like the demodulation scheme, may be conveyed as part of the multicast, e.g., as data in that respective channel or as information in a dedicated MLC. In this way, the selected multimedia coding mode and modulation scheme used on the encoder side is conveyed in the multicast so that on the decoder side, so that the proper demodulation scheme and multimedia decoding mode can be applied.

Again, some broadcasting techniques, such as FLO, may allow for a modulation scheme to be selected for each channel. In addition, many encoders allow different multimedia coding modes to be used. This disclosure proposes that both of these factors can be selected based on the content being coded, which can provide an improvement over conventional systems. Also, the modulation scheme decisions may be affected by which multimedia coding mode is selected. In any case, information identifying the multimedia coding mode and physical layer modulation scheme for each channel can be transmitted as part of the multicast so that the decoding device and select and apply the correct demodulation scheme and multimedia decoding mode.

The techniques of this disclosure can allow encoder units 12 to control the transmit mode of the physical layer in order to improve overall transmission efficiency. In one implementation encoder units 12 codes the multimedia sequences to a specific metric e.g. mean opinion score (MOS) or peak signal to noise ratio (PSNR) by all the possible coding techniques available, and after considering all elements of the capacity calculation with each of the techniques, encoder units 12 select the best combination of physical layer mode and video coding configuration for each given content. Thus, encoder units 12 may each include multiple encoders or as well as multiple configurations of a single variant of an encoder.

Encoder units 12 may be aware of the impact to audio, e.g., if audio is operated in a separate MLC for scaled coding operations, the channel capacity impact relative to the extra MLC required for audio may be considered in the implementation. For implementation convenience the calculations may exclude any effect of a separate audio MLC, if it is deemed too complex for encoder units 12 to track a data flow that dynamically transits MLCs.

Multimedia decoding device 6 may be notified over the physical layer of any impending multimedia coding mode modulation scheme change via an overhead information service (OIS). These or other types of headers or files might be used to convey changes in the modulation scheme and multimedia coding mode depending on the system that implements the techniques. In some cases, there may be provision for defining several allowed alternate modulation modes, in which case multimedia decoding device 6 may attempt multiple decodes and abandon the ones that do not work.

In one implementation, the adaptation time for multimedia coding modes and modulation schemes is one second, i.e. a so-called "superframe" boundary. In other words, the multimedia coding mode and modulation scheme selections may be made periodically, e.g., every second. Other physical layers, however, may have different physical layer adaptation rates, and the techniques of this disclosure are not limited to any specific adaptation rate.

Encoder units 12 may have a restricted set of modes that map to a specific channel configuration. Accordingly, given a specific resolution, bit rate range, and link budget target, encoder units 12 may map to a certain set of modulation modes that meet the required parameters.

Figure 2:
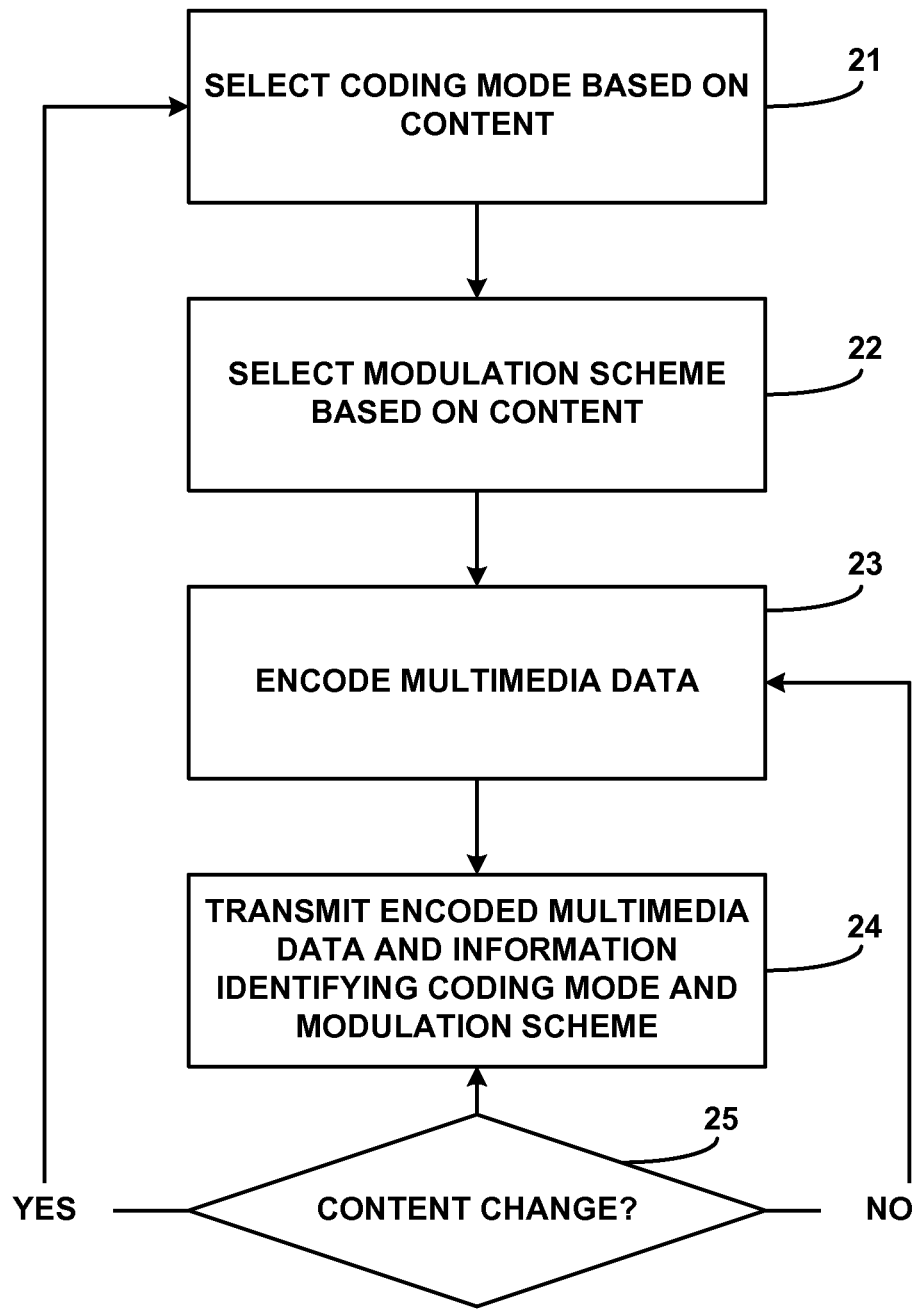
FIGS. 2 and 3 are flow diagrams according to this disclosure.
Figure 3:
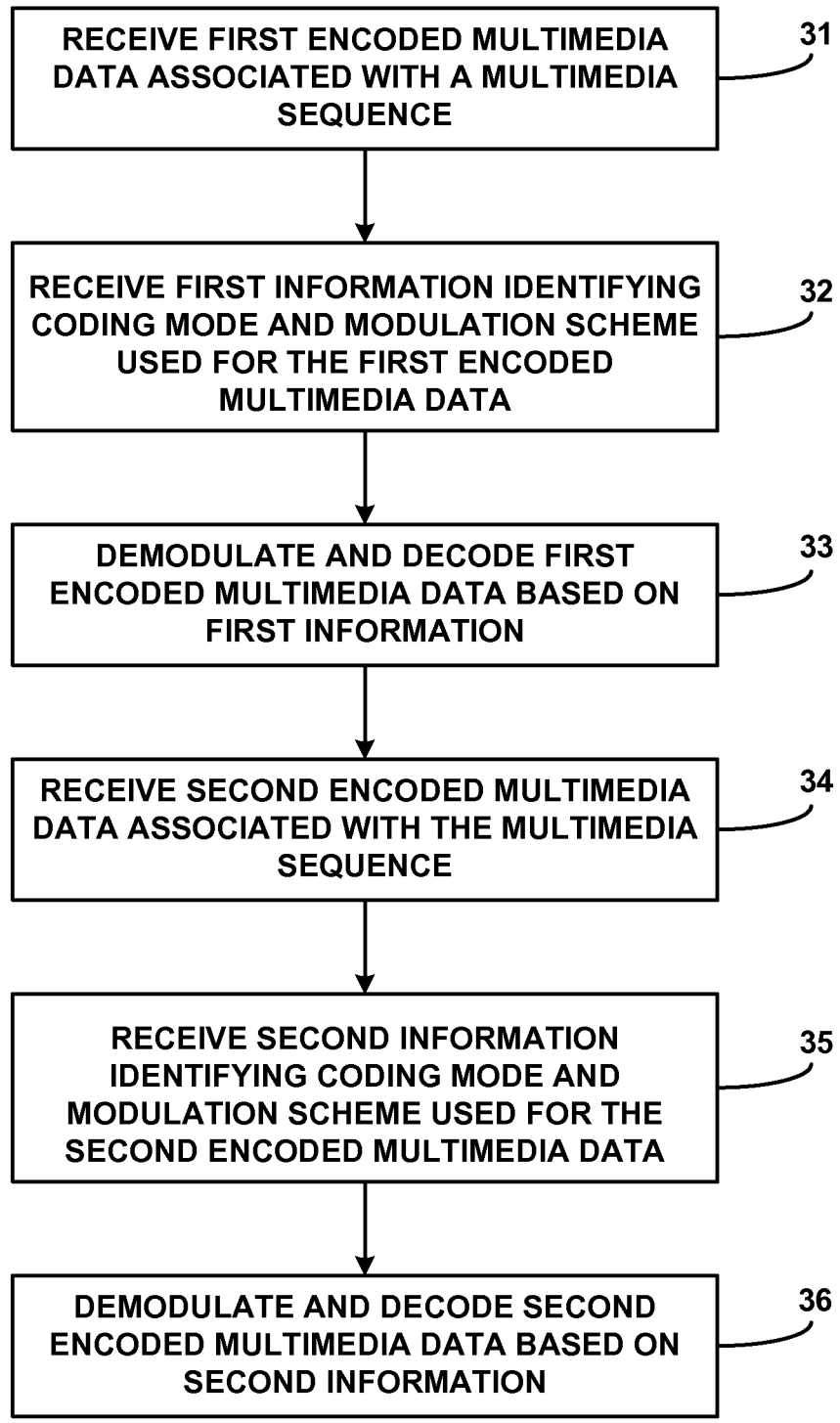

FIGS. 2 and 3 are flow diagrams according to this disclosure. FIG. 2 shows a technique that may be applied by a multimedia encoder device, such as device 4 of FIG. 1. As shown in FIG. 2, controller 15 of device 4 selects a multimedia coding mode for an encoder unit 12A based on content (21). In addition, controller also selects a physical layer modulation scheme for the channel associated with encoder unit 12A based on the content of that channel (22). Encoder unit 12A then encodes the multimedia data (23). If multiple channels are coded, multiplex unit 14 may combine the channels into a multicast.

Transmitting module 16 transmits the encoded multimedia data according to the selected multimedia coding mode (as provided by controller 15), and transmits information identifying the multimedia coding mode and physical layer modulation scheme used for that channel (24). Whenever content changes (yes branch of 25), a different multimedia coding mode may be selected (21) and/or a different physical layer modulation scheme may be selected (22). The process of FIG. 2 may occur with respect to every channel of a multicast. Moreover, the techniques of FIG. 2 could also apply in cases where a single channel of multimedia information is coded and transmitted via a modulation scheme.

FIG. 3 shows a technique that may be applied by a multimedia decoder device, such as device 6 of FIG. 1. As shown in FIG. 3, receiving module 17 of device 6 receives first encoded multimedia data associated with a multimedia sequence (31). For purposes of FIG. 3, the first encoded multimedia data may refer to encoded multimedia data associated with one channel of a multicast. In addition to the first multimedia data, receiving module 17 of device 6 also receives first information identifying the coded mode and the physical layer modulation scheme used for the first encoded multimedia data (32). This first information, for example, may be included in the respective channel of the multicast, or may be included elsewhere, such as in a dedicated MLC of the multicast defined specifically to convey such information for every channel.

Demodulation unit 18 demodulates the first encoded multimedia data based on the first information, and decoder unit 20 decodes the first encoded multimedia data based on the first information (33). In this way, first information is conveyed as part of the multicast to allow demodulation unit 18 and decoder unit 20 to apply the proper demodulation and decoding techniques commensurate with the encoding and modulation applied to the first multimedia data by device 4.

Next, receiving module 17 of device 6 receives second encoded multimedia data associated with a multimedia sequence (34). The second encoded multimedia data may be data in the same channel as the first encoded multimedia data, but may be different in terms of its content. As an example, the first encoded multimedia data may comprise frames of a real time sporting event, and the second encoded multimedia data may comprise frames of a commercial break in the sporting event. As an example, the first encoded multimedia data may comprise frames of an event or program, and the second encoded multimedia data may comprise later frames of the same even or program following a scene change. Thus, this disclosure contemplates adaptive coding and modulation over the course of a multimedia sequence, as the content of that multimedia sequence changes. Many other examples exist, and those above are merely exemplary. In some cases, the multimedia coding mode and physical layer modulation scheme are allowed to change on a frame-by-frame basis.

In addition to the second multimedia data, receiving module 17 of device 6 also receives second information identifying the coded mode and the physical layer modulation scheme used for the second encoded multimedia data (35). Like the first information, this second information may be included in the respective channel of the multicast, or may be included elsewhere, such as in a dedicated MLC of the multicast defined specifically to convey such information for every channel. The information that identifies the coded mode and the physical layer modulation scheme may be created by controller 15 and transmitted from transmitting module 16 to receiving module 17.

Demodulation unit 18 demodulates the second encoded multimedia data based on the second information, and decoder unit 20 decodes the second encoded multimedia data based on the second information (33). In this manner, second information is conveyed as part of the multicast to allow demodulation unit 18 and decoder unit 20 to apply the proper demodulation and decoding techniques commensurate with the encoding and modulation applied to the second multimedia data by device 4. Accordingly, following a scene change when the first encoded multimedia sequence changes to the second encoded multimedia sequence, the first information can change to the second information to identify any changes in the multimedia coding mode and/or physical layer modulation scheme used in the coding and modulation of the multimedia data.

Figure 4:
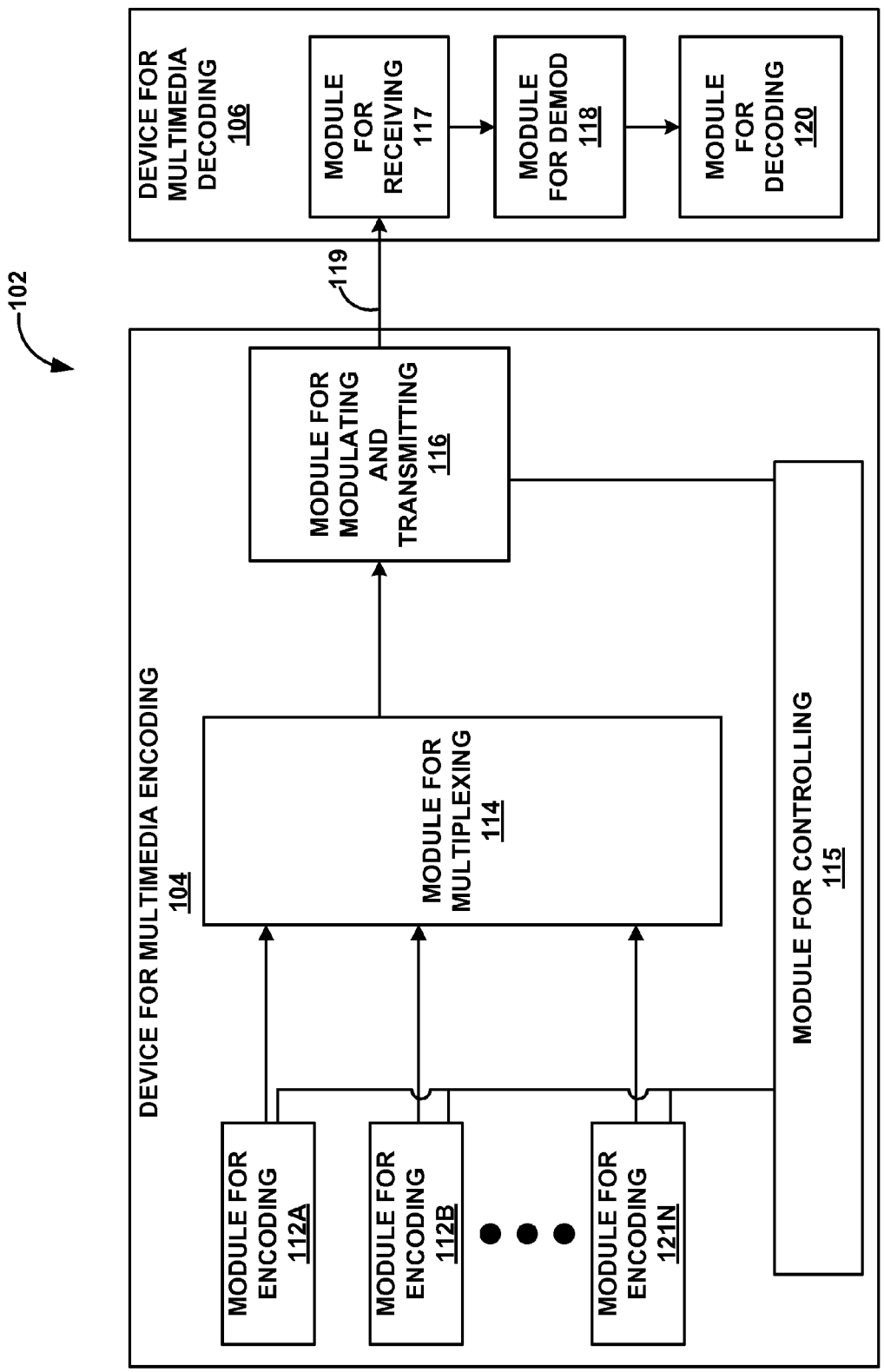
FIG. 4 is another block diagram illustrating an exemplary system according to this disclosure.

FIG. 4 is another block diagram illustrating a system 102 that may implement one or more of the techniques described herein. As shown in FIG. 4, device for multimedia encoding 104 includes a plurality of modules for encoding 112A-112N (collectively "modules 12"). Each of these modules for encoding 112 may comprise a separate encoder or encoding process. Each of modules 112 encodes multimedia content for a different channel. Once encoded, the content from modules for encoding 112 is provided to module for multiplexing 114, which combines the content into a multicast.

Module for modulating and transmitting 116 then modulates the channels and transmits the multicast over a communication channel 119, which is typically a wireless channel, but is not limited by any particular wireless communication technique. A number of devices for multimedia decoding may receive the multicast, although device 106 is the only receiving device illustrated.

According to this disclosure, module for controlling 115 selects the multimedia coding modes and physical layer modulation schemes used for each respective channel. In particular, module for controlling 115 selects the multimedia coding modes and physical layer modulation schemes based on content of the different channels. In this manner, the multimedia coding modes and physical layer modulation schemes are made content-adaptive. Information identifying the selected multimedia coding modes and physical layer modulation schemes are also transmitted with the multicast to facilitate demodulation and decoding.

Module for receiving 117 receives the multicast over wireless channel 119. Module for demodulating may then tune to a particular channel of interest, e.g., in response to a user selection, and may demodulate the content of that channel. Module for decoding 120 then decodes the content of the demodulated channel. Module for demodulating 118 and module for decoding 120 use the transferred information that identifies the multimedia coding mode and physical modulation scheme used for the coding and modulation in order to select the proper demodulation techniques and decoding techniques to apply.

In accordance with this disclosure, means for encoding may comprise encoder units 12 (FIG. 1) or modules for encoding 112 (FIG. 4). Means for multiplexing may comprise a multiplex unit 14 (FIG. 1) or a module for multiplexing 114 (FIG. 4). Means for modulating and/or transmitting may comprise a transmitting module 16 (FIG. 1) or a module for modulating and transmitting 116 (FIG. 4). Means for selecting the multimedia coding mode and physical layer modulation scheme may comprise a controller 15 (FIG. 1) or a means for controlling 115 (FIG. 4). Modulators and transmitters may be separate units, or may be integrated into a common transmitting module as illustrated in FIG. 1.

On the receiving side, means for receiving may comprise a receiving module 17 (FIG. 1) or a module for receiving 117 (FIG. 4). Means for demodulating may comprise a demodulation unit 18 (FIG. 1) or a module for demodulating 118 (FIG. 4). Means for decoding may comprise a decoding unit 20 (FIG. 1) or a module for decoding 120 (FIG. 4).

Figure 5:
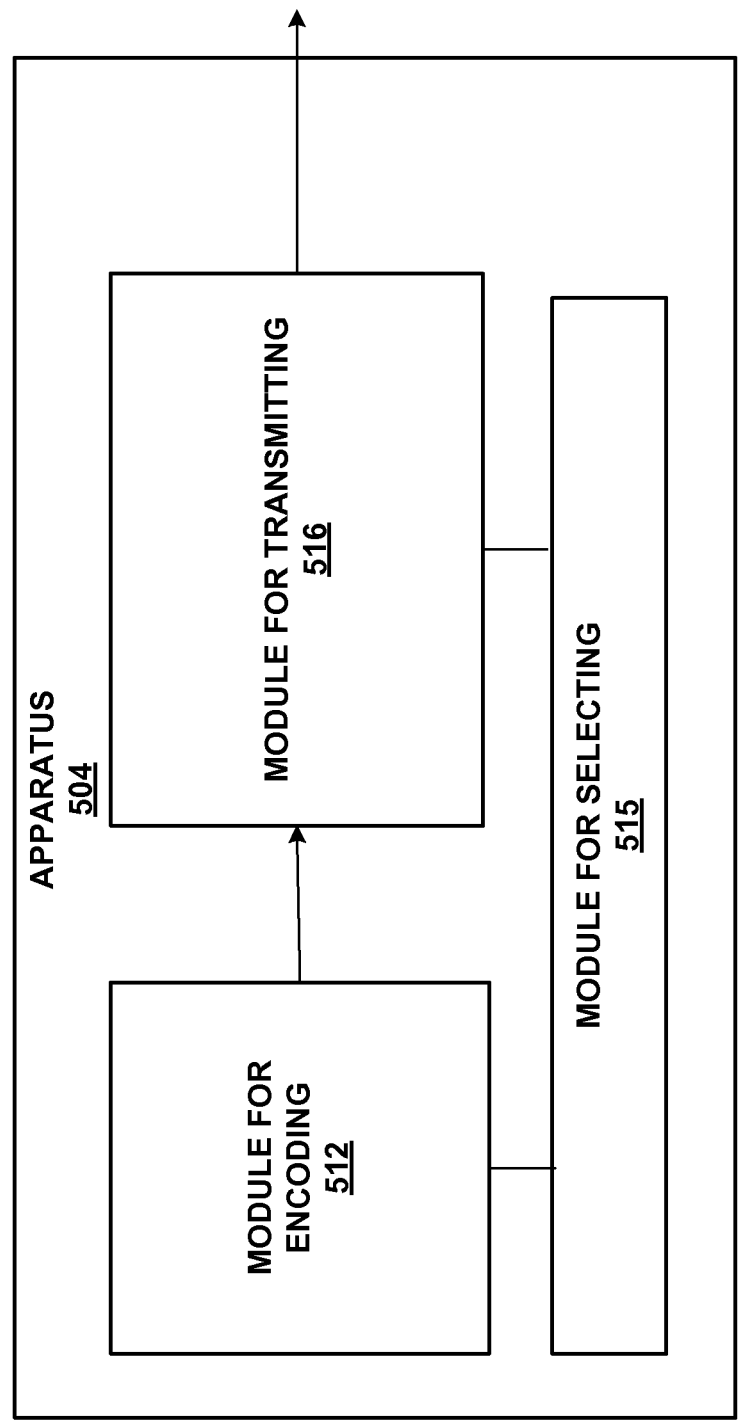
FIG. 5 is a block diagram illustrating an exemplary apparatus that processes multimedia data on a transmit side according to this disclosure.

FIG. 5 is a block diagram illustrating an exemplary apparatus 504 that processes multimedia data on a transmit side according to this disclosure. Apparatus 504 includes a module for selecting 515, which may comprise means for selecting a multimedia coding mode from a plurality of potential multimedia coding modes and a physical layer modulation scheme from a plurality of potential physical layer modulation scheme for the multimedia data based on content of the multimedia data. Apparatus 504 also includes a module for encoding 512, which may comprise means for coding the multimedia data based on the selected multimedia coding mode. Apparatus 504 also includes a module for transmitting 516, which may comprise means for transmitting the coded multimedia data according to the selected physical layer modulation scheme.

Figure 6:
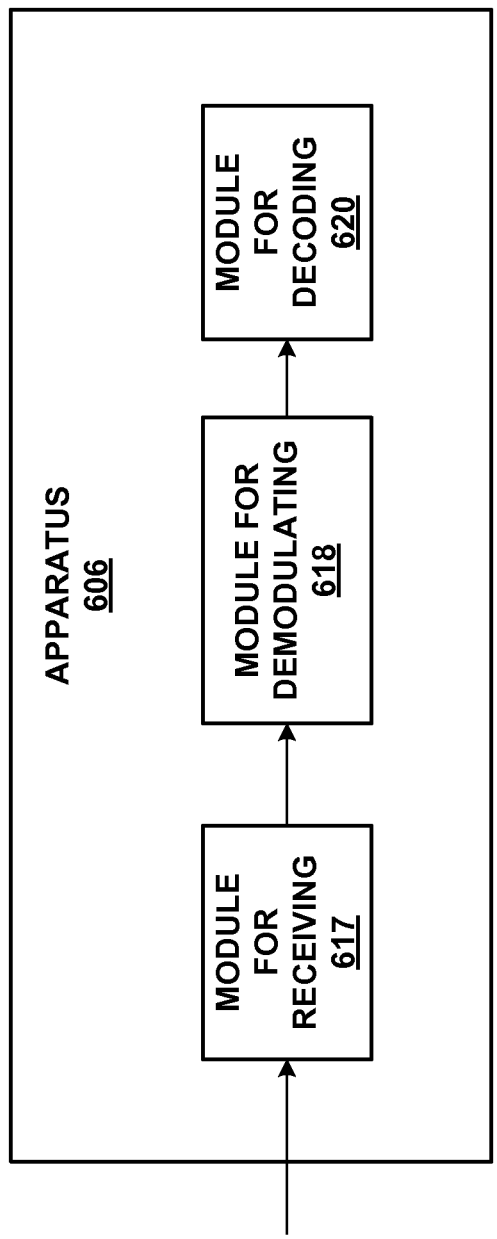
FIG. 6 is a block diagram illustrating an exemplary apparatus that processes multimedia data on a receive side according to this disclosure.

FIG. 6 is a block diagram illustrating an exemplary apparatus 606 that processes multimedia data on a receive side according to this disclosure. Apparatus 606 includes a module for receiving 617, which may comprise means for receiving first multimedia data associated with a multimedia sequence. Module for receiving 617 may also comprise means for receiving first information identifying a first selected multimedia coding mode and a first selected physical layer modulation scheme used by an encoding device for the first multimedia data.

Apparatus 606 also includes a module for demodulating 618, which may comprise means for demodulating the first multimedia data based on the selected physical layer modulation scheme. Apparatus 606 also includes a module for decoding 620, which may comprise means for decoding the first multimedia data based on the selected multimedia coding mode.

In FIG. 6, module for receiving 617 may also comprise means for receiving second multimedia data associated with the multimedia sequence and means for receiving second information identifying a second selected multimedia coding mode and a second selected physical layer modulation scheme used by an encoding device for the second multimedia data. Module for demodulating 618 may also comprise means for demodulating the second multimedia data based on the second selected physical layer modulation scheme. Module for decoding 620 may also comprise means for decoding the second multimedia data based on the second selected multimedia coding mode.

A number of examples have been described. The techniques of this disclosure may improve the transfer of multimedia information, particularly in a wireless mobile device setting. The techniques described herein may be implemented in hardware, software, firmware, or any combination thereof. If implemented in software, the techniques may be realized at least in part by one or more stored or transmitted instructions or code on a computer-readable medium of a computer program product. Computer-readable media may include computer storage media, communication media, or both, and may include any medium that facilitates transfer of a computer program from one place to another. A storage media may be any available media that can be accessed by a computer. A computer program product may include packaging materials.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Nevertheless, various modifications may be made to the techniques described without departing from the scope of the following claims.

The invention claimed is:

1. A method of processing multimedia data, the method comprising:
   selecting, by a controller, a multimedia coding mode from a plurality of potential multimedia coding modes for an encoder to encode the multimedia data based on multimedia content of the multimedia data prior to encoding the multimedia data;
   selecting, by the controller, a physical layer modulation scheme from a plurality of potential physical layer modulation schemes for transmission of the multimedia data based on the multimedia content of the multimedia data;
   encoding, by the encoder, the multimedia data according to the selected multimedia coding mode; and
   transmitting, by a transmitting module of a multimedia encoder over a wireless channel, information to a decoding device, the information identifying the selected multimedia coding mode;
   transmitting, by the transmitting module over the wireless channel, the encoded multimedia data according to the selected physical layer modulation scheme; and
   selecting, by the controller, a different multimedia coding mode and a different physical layer modulation scheme at periodic intervals of time associated with a transmission frame.

2. The method of claim 1, further comprising transmitting information to a decoding device, the information identifying the selected physical layer modulation scheme, wherein the multimedia coding mode is selected to rely on frame interpolation at a decoder.

3. The method of claim 1, further comprising selecting a different multimedia coding mode and a different physical layer modulation scheme in response to changes in the content of the multimedia data.

4. The method of claim 3, further comprising:
   encoding the multimedia data with the changes in the content according to the different multimedia coding mode; and
   transmitting the encoded multimedia data with the changes in the content according to the different physical layer modulation scheme.

5. The method of claim 1, wherein selecting the multimedia coding mode and selecting the physical layer modulation scheme are performed substantially simultaneously.

6. The method of claim 1, wherein the plurality of multimedia coding modes includes at least one of a first multimedia coding mode that relies on frame interpolation at a decoder or a second multimedia coding mode that does not rely on frame interpolation.

7. The method of claim 1, wherein the plurality of multimedia coding modes includes at least one of a first multimedia coding mode that implements scalable coding or a second multimedia coding mode that does not implement scalable coding.

8. The method of claim 7, wherein the scalable coding provides signal-to-noise scalability.

9. The method of claim 7, wherein the scalable coding provides temporal scalability.

10. The method of claim 7, wherein the scalable coding provides spatial scalability.

11. The method of claim 1, wherein the physical layer modulation scheme is either a first physical layer modulation scheme that implements quadrature phase shift keying (QPSK) or a second physical layer modulation scheme that implements quadrature amplitude modulation (QAM).

12. The method of claim 1, wherein the physical layer modulation scheme is either a first physical layer modulation scheme or a second physical layer modulation scheme, wherein the first physical layer modulation scheme codes more bits per second than the second physical layer modulation scheme.

13. The method of claim 1, wherein the physical layer modulation scheme is either a first physical layer modulation scheme that implements code division multiple access (CDMA) or a second physical layer modulation scheme that implements orthogonal frequency division multiplexing (OFDM).

14. A method of processing multimedia data, the method comprising:
   receiving, by a receiving module, first multimedia data associated with a multimedia sequence;
   receiving, by the receiving module, first information identifying a first selected multimedia coding mode and a first selected physical layer modulation scheme used by an encoding device from the encoding device for the first multimedia data, wherein the first selected multimedia coding mode is selected from a plurality of potential multimedia coding modes based on multimedia content of the first multimedia data, and wherein the first selected physical layer modulation scheme is selected based on the multimedia content of the first multimedia data and on the first selected multimedia coding mode, wherein the plurality of potential multimedia coding modes comprises a first multimedia coding mode;
   demodulating, by a demodulator, and decoding, by the decoder, the first multimedia data based on the selected physical layer modulation scheme and the selected multimedia coding mode;
   receiving, by the receiving module, second multimedia data associated with the multimedia sequence;
   receiving, by the receiving module, second information identifying a second selected multimedia coding mode and a second selected physical layer modulation scheme used by an encoding device for the second multimedia data, wherein the second selected multimedia coding mode is selected from the plurality of potential multimedia coding modes based on content of the second multimedia data, and wherein the second selected physical layer modulation scheme is selected based on the content of the second multimedia data and on the second selected multimedia coding mode;

demodulating, by the demodulator, and decoding, by the decoder, the second multimedia data based on the second selected physical layer modulation scheme and the second selected multimedia coding mode; and receiving, by the receiving module, a different multimedia coding mode and a different physical layer modulation scheme at periodic intervals of time associated with a transmission frame boundary.

15. The method of claim 14, wherein:

the first and second selected multimedia coding modes are different from one another and each comprise either a multimedia coding mode that relies on frame interpolation at a decoder or a multimedia coding mode that does not rely on frame interpolation; and the first and second physical layer modulation schemes are different from one another and each comprise either a physical layer modulation scheme that implements quadrature phase shift keying (QPSK) or a physical layer modulation scheme that implements quadrature amplitude modulation (QAM).

16. An apparatus that processes multimedia data, the apparatus comprising:

a controller that selects a multimedia coding mode from a plurality of potential multimedia coding modes and a physical layer modulation scheme from a plurality of potential physical layer modulation schemes for the multimedia data based on content of the multimedia data prior to transmission of the multimedia data, wherein the plurality of potential multimedia coding modes comprises a first multimedia coding mode, wherein the physical layer modulation scheme is further selected based on the selected multimedia coding mode;

an encoder that applies the selected multimedia coding mode to code the multimedia data; and a transmitting module that applies the selected physical layer modulation scheme to modulate the coded multimedia data for transmission over a wireless channel, wherein the transmitting module transmits to a decoding device, the information identifying the selected multimedia coding mode, wherein a different multimedia coding mode and a different physical layer modulation scheme are selected at periodic intervals of time associated with a transmission frame.

17. The apparatus of claim 16, wherein the transmitting module transmits information to the decoding device, the information identifying the selected physical layer modulation scheme, and wherein the first multimedia coding mode relies on frame interpolation at the decoding device.

18. The apparatus of claim 16, wherein the controller selects a different multimedia coding mode and a different physical layer modulation scheme in response to changes in the content of the multimedia data.

19. The apparatus of claim 18, wherein:

the encoder encodes the multimedia data with the changes in the content according to the different multimedia coding mode; and the transmitting module transmits the encoded multimedia data with the changes in the content according to the different physical layer modulation scheme.

20. The apparatus of claim 16, wherein the controller selects the multimedia coding mode and the physical layer modulation scheme substantially simultaneously.

21. The apparatus of claim 16, wherein the selected multimedia coding mode is either a first multimedia coding mode that relies on frame interpolation at a decoder or a second multimedia coding mode that does not rely on frame interpolation.

22. The apparatus of claim 16, wherein the selected multimedia coding mode is either a first multimedia coding mode that implements scalable coding or a second multimedia coding mode that does not implement scalable coding.

23. The apparatus of claim 22, wherein the scalable coding provides signal-to-noise scalability.

24. The apparatus of claim 22, wherein the scalable coding provides temporal scalability.

25. The apparatus of claim 22, wherein the scalable coding provides spatial scalability.

26. The apparatus of claim 16, wherein the physical layer modulation scheme is either a first physical layer modulation scheme that implements quadrature phase shift keying (QPSK) or a second physical layer modulation scheme that implements quadrature amplitude modulation (QAM).

27. The apparatus of claim 16, wherein the physical layer modulation scheme is either a first physical layer modulation scheme or a second physical layer modulation scheme, wherein the first physical layer modulation scheme codes more bits per second than the second physical layer modulation scheme.

28. The apparatus of claim 16, wherein the physical layer modulation scheme is either a first physical layer modulation scheme that implements code division multiple access (CDMA) or a second physical layer modulation scheme that implements orthogonal frequency division multiplexing (OFDM).

29. An apparatus that processes multimedia data, the apparatus comprising:

a receiving module that receives first multimedia data associated with a multimedia sequence and receives first information identifying a first selected multimedia coding mode and a first selected physical layer modulation scheme used by an encoding device from the encoding device for the first multimedia data, wherein the first selected multimedia coding mode is selected from a plurality of potential multimedia coding modes based on multimedia content of the first multimedia data, and wherein the first selected physical layer modulation scheme is selected based on the multimedia content of the first multimedia data and on the first selected multimedia coding mode, wherein the plurality of potential multimedia coding modes comprises a first multimedia coding mode;

a demodulator that demodulates the first multimedia data based on the selected physical layer modulation scheme; and the decoder that decodes the first multimedia data based on the selected multimedia coding mode, wherein the receiving module receives second multimedia data associated with the multimedia sequence and receives second information identifying a second selected multimedia coding mode and a second selected physical layer modulation scheme used by an encoding device for the second multimedia data, wherein the second selected multimedia coding mode is selected from the plurality of potential multimedia coding modes based on content of the second multimedia data, wherein the second selected physical layer modulation scheme is selected based on the content of the second multimedia data and on the second selected multimedia coding mode, and wherein the second selected multimedia coding mode and the second selected physical layer modulation scheme are selected at periodic intervals of time associated with a transmission frame, the demodulator demodulates the second multimedia data based on the second selected physical layer modulation scheme, and the decoder decodes the second multimedia data based on the second selected multimedia coding mode.

30. The apparatus of claim 29, wherein:

the first and second selected multimedia coding modes are different from one another and each comprise either a multimedia coding mode that relies on frame interpolation at a decoder or a multimedia coding mode that does not rely on frame interpolation; and the first and second physical layer modulation schemes are different from one another and each comprise either a physical layer modulation scheme that implements quadrature phase shift keying (QPSK) or a physical layer modulation scheme that implements quadrature amplitude modulation (QAM).

31. An apparatus that processes multimedia data, the apparatus comprising:

means for selecting a multimedia coding mode from a plurality of potential multimedia coding modes and a physical layer modulation scheme from a plurality of potential physical layer modulation scheme for the multimedia data based on content of the multimedia data and prior to coding the multimedia data, wherein the plurality of potential multimedia coding modes comprises a first multimedia coding mode, wherein the physical layer modulation scheme is further selected based on the multimedia coding mode;

means for coding the multimedia data based on the selected multimedia coding mode;

means for transmitting the coded multimedia data according to the selected physical layer modulation scheme, wherein the means for transmitting transmits to a decoding device, the information identifying the selected multimedia coding mode; and means for selecting a different multimedia coding mode and a different physical layer modulation scheme at periodic intervals of time associated with a transmission frame.

32. The apparatus of claim 31, wherein the means for transmitting transmits information to the decoding device, the information identifying the selected physical layer modulation scheme, and wherein the first multimedia coding mode relies on frame interpolation at the decoding device.

33. The apparatus of claim 31, wherein the means for selecting selects a different multimedia coding mode and a different physical layer modulation scheme in response to changes in the content of the multimedia data.

34. The apparatus of claim 33, wherein:

the means for encoding encodes the multimedia data with the changes in the content according to the different multimedia coding mode; and the means for transmitting transmits the encoded multimedia data with the changes in the content according to the different physical layer modulation scheme.

35. The apparatus of claim 31, wherein the means for selecting selects a different multimedia coding mode and a different physical layer modulation scheme at periodic intervals of time.

36. The apparatus of claim 31, wherein the means for selecting selects the multimedia coding mode and the physical layer modulation scheme substantially simultaneously.

37. The apparatus of claim 31, wherein the selected multimedia coding mode is either a first multimedia coding mode that relies on frame interpolation at a decoder or a second multimedia coding mode that does not rely on frame interpolation.

38. The apparatus of claim 31, wherein the selected multimedia coding mode is either a first multimedia coding mode that implements scalable coding or a second multimedia coding mode that does not implement scalable coding.

39. The apparatus of claim 38, wherein the scalable coding provides signal-to-noise scalability.

40. The apparatus of claim 38, wherein the scalable coding provides temporal scalability.

41. The apparatus of claim 38, wherein the scalable coding provides spatial scalability.

42. The apparatus of claim 31, wherein the physical layer modulation scheme is either a first physical layer modulation scheme that implements quadrature phase shift keying (QPSK) or a second physical layer modulation scheme that implements quadrature amplitude modulation (QAM).

43. The apparatus of claim 31, wherein the physical layer modulation scheme is either a first physical layer modulation scheme or a second physical layer modulation scheme, wherein the first physical layer modulation scheme codes more bits per second than the second physical layer modulation scheme.

44. The apparatus of claim 31, wherein the physical layer modulation scheme is either a first physical layer modulation scheme that implements code division multiple access (CDMA) or a second physical layer modulation scheme that implements orthogonal frequency division multiplexing (OFDM).

45. An apparatus that processes multimedia data, the apparatus comprising:

means for receiving first multimedia data associated with a multimedia sequence;

means for receiving first information identifying a first selected multimedia coding mode and a first selected physical layer modulation scheme used by an encoding device from the encoding device for the first multimedia data, wherein the first selected multimedia coding mode is selected from a plurality of potential multimedia coding modes based on content of the first multimedia data, and wherein the first selected physical layer modulation scheme is selected based on the content of the first multimedia data and on the first selected multimedia coding mode, wherein the plurality of potential multimedia coding modes comprises a first multimedia coding mode;

means for demodulating the first multimedia data based on the selected physical layer modulation scheme;

means for decoding the first multimedia data based on the multimedia coding mode;

means for receiving second multimedia data associated with the multimedia sequence;

means for receiving second information identifying a second selected multimedia coding mode and a second selected physical layer modulation scheme used by an encoding device for the second multimedia data, wherein the second selected multimedia coding mode is selected from the plurality of potential multimedia coding modes based on content of the second multimedia data, and wherein the second selected physical layer modulation scheme is selected based on the content of the second multimedia data and on the second selected multimedia coding mode;

means for demodulating the second multimedia data based on the second selected physical layer modulation scheme;

means for decoding the second multimedia data based on the second selected multimedia coding mode; and means for receiving a different multimedia coding mode and a different physical layer modulation scheme at periodic intervals of time associated with a transmission frame.

46. The apparatus of claim 45, wherein:

the first and second selected multimedia coding modes are different from one another and each comprise either a multimedia coding mode that relies on frame interpolation at a decoder or a multimedia coding mode that does not rely on frame interpolation; and the first and second physical layer modulation schemes are different from one another and each comprise either a physical layer modulation scheme that implements quadrature phase shift keying (QPSK) or a physical layer modulation scheme that implements quadrature amplitude modulation (QAM).

47. A non-transitory computer readable medium comprising computer executable instructions stored thereon that upon execution cause a computer to:

select a multimedia coding mode from a plurality of potential multimedia coding modes for an encoder to encode the multimedia data based on content of the multimedia data, wherein the plurality of potential multimedia coding modes comprises a first multimedia coding mode;

select a physical layer modulation scheme from a plurality of potential physical layer modulation schemes for transmission of the multimedia data based on content of the multimedia data and the multimedia coding mode;

encode the multimedia data according to the selected multimedia coding mode;

transmit, by a transmitting module of a multimedia encoder, information to a decoding device, the information identifying the selected multimedia coding mode; and transmit the encoded multimedia data according to the selected physical layer modulation scheme; and select a different multimedia coding mode and a different physical layer modulation scheme at periodic intervals of time associated with a transmission frame.

48. A non-transitory computer readable medium comprising computer executable instructions stored thereon that upon execution cause a computer to:

receive first multimedia data associated with a multimedia sequence;

receive first information identifying a first selected multimedia coding mode and a first selected physical layer modulation scheme used by an encoding device from the encoding device for the first multimedia data, wherein the first selected multimedia coding mode is selected from a plurality of potential multimedia coding modes based on content of the first multimedia data, and wherein the first selected physical layer modulation scheme is selected based on the content of the first multimedia data and on the first selected multimedia coding mode, wherein the plurality of potential multimedia coding modes comprises a first multimedia coding mode;

demodulate and decode the first multimedia data based on the selected physical layer modulation scheme and the multimedia coding mode;

receive second multimedia data associated with the multimedia sequence;

receive second information identifying a second selected multimedia coding mode and a second selected physical layer modulation scheme used by an encoding device for the second multimedia data, wherein the second selected multimedia coding mode is selected from the plurality of potential multimedia coding modes based on content of the second multimedia data, and wherein the second selected physical layer modulation scheme is selected based on the content of the second multimedia data and on the second selected multimedia coding mode;

demodulate and decode the second multimedia data based on the second selected physical layer modulation scheme and the second selected multimedia coding mode; and receive a different multimedia coding mode and a different physical layer modulation scheme at periodic intervals of time associated with a transmission frame.

49. A processor that processes multimedia data, the processor being configured to:

select a multimedia coding mode from a plurality of potential multimedia coding modes for an encoder to encode the multimedia data based on content of the multimedia data as determined at the processor, wherein the plurality of potential multimedia coding modes comprises a first multimedia coding mode;

select a physical layer modulation scheme from a plurality of potential physical layer modulation schemes for transmission of the multimedia data based on content of the multimedia data and the selected multimedia coding mode;

encode the multimedia data according to the selected multimedia coding mode;

forward to a transmitting module of a multimedia encoder ,for transmitting to a decoding device over a wireless channel, information identifying the selected multimedia coding mode;

forward the encoded multimedia data to a transmitting module for transmission according to the selected physical layer modulation scheme; and selecting a different multimedia coding mode and a different physical layer modulation scheme at periodic intervals of time associated with a transmission frame.

50. A processor that processes multimedia data, the processor being configured to:

receive first multimedia data associated with a multimedia sequence;

receive first information identifying a first selected multimedia coding mode and a first selected physical layer modulation scheme used by an encoding device from the encoding device for the first multimedia data, wherein the first selected multimedia coding mode is selected from a plurality of potential multimedia coding modes based on content of the first multimedia data, and wherein the first selected physical layer modulation scheme is selected based on the content of the first multimedia data and on the first selected multimedia coding mode, wherein the plurality of potential multimedia coding modes comprises a first multimedia coding mode;

demodulate and decode the first multimedia data based on the selected physical layer modulation scheme and the selected multimedia coding mode;

receive second multimedia data associated with the multimedia sequence;

receive second information identifying a second selected multimedia coding mode and a second selected physical layer modulation scheme used by an encoding device for the second multimedia data, wherein the second selected multimedia coding mode is selected from the plurality of potential multimedia coding modes based on content of the second multimedia data, wherein the second selected physical layer modulation scheme is selected based on the content of the second multimedia data and on the second selected multimedia coding mode, and wherein the second selected multimedia coding mode and the second physical layer modulation scheme are selected at periodic intervals of time associated with a transmission frame, demodulate and decode the second multimedia data based on the second selected physical layer modulation scheme and the second selected multimedia coding mode.

51. A method of processing multimedia data, the method comprising:

selecting for each channel of a multicast of a plurality of channels having different content to subscriber devices, by a controller, a multimedia coding mode from a plurality of potential multimedia coding modes for an encoder to encode the multimedia data based on content of the multimedia data for the channel;

selecting for each channel of the multicast, by the controller, a physical layer modulation scheme from a plurality of potential physical layer modulation schemes for transmission of the multimedia data based on content of the multimedia data for the channel and the multimedia coding mode;

encoding for each channel of the multicast, by the encoder, the multimedia data according to the selected multimedia coding mode for the channel;

transmitting for every channel of the multicast, by a transmitting module of a multimedia encoder over the plurality of channels to a decoding device, information identifying the selected multimedia coding for the channel, and the encoded multimedia data of the channel according to the selected physical layer modulation scheme for the channel; and selecting a different multimedia coding mode and a different physical layer modulation scheme at periodic intervals of time associated with a transmission frame.

52. The method of claim 51, further comprising transmitting information to the decoding device, information identifying the selected physical layer modulation scheme, and wherein the multimedia coding mode is selected to rely on frame interpolation at a decoder for the channel.

53. The method of claim 51, further comprising selecting a different multimedia coding mode and a different physical layer modulation scheme in response to changes in the content of the multimedia data.

54. The method of claim 53, further comprising:

encoding the multimedia data with the changes in the content according to the different multimedia coding mode; and transmitting the encoded multimedia data with the changes in the content according to the different physical layer modulation scheme.

55. An apparatus that processes multimedia data, the apparatus comprising:

a controller that selects, for each channel of a multicast of a plurality of channels having different content to subscriber devices, a multimedia coding mode from a plurality of potential multimedia coding modes based on content of the multimedia data for the channel as determined at the apparatus, and that selects for each channel of the multicast, a physical layer modulation scheme from a plurality of potential physical layer modulation schemes for transmission of the multimedia data based on content of the multimedia data for the channel and the multimedia coding mode, and that selects a different multimedia coding mode and a different physical layer modulation scheme at periodic intervals of time associated with a transmission frame;

an encoder that encodes, for each channel of the multicast, the multimedia data according to the selected multimedia coding mode for the channel; and a transmitting module that transmits to a decoding device for every channel of the multicast, over the plurality of channels, information identifying the selected multimedia coding mode and the physical layer modulation scheme for the channel, and the encoded multimedia data of the channel according to the selected physical layer modulation scheme for the channel.

56. The apparatus of claim 55, wherein the transmitting module transmits information to the decoding device, the information identifying the selected physical layer modulation scheme.

57. The apparatus of claim 55, wherein the controller selects a different multimedia coding mode and a different physical layer modulation scheme in response to changes in the content of the multimedia data.

58. The apparatus of claim 57, wherein:

the encoder encodes the multimedia data with the changes in the content according to the different multimedia coding mode; and the transmitting module transmits the encoded multimedia data with the changes in the content according to the different physical layer modulation scheme.

59. The apparatus of claim 55, wherein the controller selects a different multimedia coding mode and a different physical layer modulation scheme at periodic intervals of time.

60. An apparatus that processes multimedia data, the apparatus comprising:

means for selecting, for each channel of a multicast of a plurality of channels having different content to subscriber devices, a multimedia coding mode from a plurality of potential multimedia coding modes for an encoder to encode the multimedia data based on content of the multimedia data for the channel;

means for selecting, for each channel of the multicast, a physical layer modulation scheme from a plurality of potential physical layer modulation schemes for transmission of the multimedia data based on content of the multimedia data for the channel and the selected multimedia coding mode for the channel;

means for encoding, for each channel of the multicast, the multimedia data according to the multimedia coding mode;

means for transmitting for every channel of the multicast to a decoding device, over the plurality of channels, information identifying the selected multimedia coding mode and the physical layer modulation scheme for the channel, and the encoded multimedia data of the channel according to the selected physical layer modulation scheme for the channel; and means for selecting a different multimedia coding mode and a different physical layer modulation scheme at periodic intervals of time associated with a transmission frame.

61. The apparatus of claim 60, wherein the means for transmitting transmits information to the decoding device, the information identifying the selected physical layer modulation scheme, and wherein the multimedia coding mode is selected to rely on frame interpolation at a decoder for the channel.

62. The apparatus of claim 60, wherein the means for selecting selects a different multimedia coding mode and a different physical layer modulation scheme in response to changes in the content of the multimedia data.

63. The apparatus of claim 62, wherein:
the means for encoding encodes the multimedia data with the changes in the content according to the different multimedia coding mode; and
the means for transmitting transmits the encoded multimedia data with the changes in the content according to the different physical layer modulation scheme.

64. The apparatus of claim 60, wherein the means for selecting selects a different multimedia coding mode and a different physical layer modulation scheme at periodic intervals of time.

65. A non-transitory computer readable medium comprising computer executable instructions stored thereon that upon execution cause a computer to:
select for each channel of a multicast of a plurality of channels having different content to subscriber devices, a multimedia coding mode from a plurality of potential multimedia coding modes for an encoder to encode the multimedia data based on content of the multimedia data for the channel;
select for each channel of the multicast, a physical layer modulation scheme from a plurality of potential physical layer modulation schemes for transmission of the multimedia data based on content of the multimedia data for the channel and the multimedia coding mode;
encode for each channel of the multicast, the multimedia data according to the selected multimedia coding mode for the channel;
transmit, by a transmit module of a multimedia encoder, to a decoding device, for every channel of the multicast over the plurality of channels, information identifying the selected multimedia coding mode and the physical layer modulation scheme for the channel, and the encoded multimedia data of the channel according to the selected physical layer modulation scheme for the channel; and
select a different multimedia coding mode and a different physical layer modulation scheme at periodic intervals of time associated with a transmission frame.

66. The computer readable medium of claim 65, further comprising computer executable instructions stored thereon that upon execution cause the computer to transmit information to the decoding device, the information identifying the selected physical layer modulation scheme.

67. The computer readable medium of claim 65, further comprising computer executable instructions stored thereon that upon execution cause the computer to select a different multimedia coding mode and a different physical layer modulation scheme in response to changes in the content of the multimedia data.

68. The computer readable medium of claim 67, further comprising computer executable instructions stored thereon that upon execution cause the computer to:
encode the multimedia data with the changes in the content according to the different multimedia coding mode; and
transmit the encoded multimedia data with the changes in the content according to the different physical layer modulation scheme.

* * * * *